US012706413B1

(12) United States Patent
Strider et al.

(10) Patent No.: US 12,706,413 B1
(45) Date of Patent: Aug. 11, 2026

(54) CABLE CONNECTOR WITH FILLER CAP

(71) Applicant: AIRBORN, LLC, Georgetown, TX (US)

(72) Inventors: Ryan Strider, Georgetown, TX (US); Kevin Traugott, Georgetown, TX (US); Matt Gold, Little Falls, MN (US); William Rhea, Georgetown, TX (US)

(73) Assignee: AIRBORN, LLC

( * ) Notice: Subject to any disclaimer, the term of this patent is extended or adjusted under 35 U.S.C. 154(b) by 429 days.

(21) Appl. No.: 18/137,285

(22) Filed: Apr. 20, 2023

Related U.S. Application Data

(60) Provisional application No. 63/333,062, filed on Apr. 20, 2022.

(51) Int. Cl.
*H01R 12/75* (2011.01)
*H01R 13/502* (2006.01)
*H01R 12/70* (2011.01)
*H01R 12/71* (2011.01)

(52) U.S. Cl.
CPC ......... *H01R 13/502* (2013.01); *H01R 12/707* (2013.01); *H01R 12/716* (2013.01)

(58) Field of Classification Search
CPC ... H01R 13/502; H01R 12/707; H01R 12/716
See application file for complete search history.

(56) References Cited

U.S. PATENT DOCUMENTS 2,022,669 A 12/1935 Keefe
3,167,373 A 1/1965 Kostich
3,924,922 A 12/1975 DeCenzo
4,090,772 A 5/1978 Goodman
4,461,531 A 7/1984 Davis et al.
4,934,967 A 6/1990 Marks et al.
4,986,769 A 1/1991 Adams, III et al.
4,993,975 A 2/1991 Asick et al.
5,051,100 A 9/1991 Fukuda
(Continued)

FOREIGN PATENT DOCUMENTS

CN 104882691 B 10/2017
CN 110492304 A 11/2019
(Continued)

*Primary Examiner* — Abdullah A Riyami
*Assistant Examiner* — Nelson R. Burgos-Guntin
(74) *Attorney, Agent, or Firm* — Perilla Knox & Hildebrandt LLP; Usha Munukutla-Parker

(57) ABSTRACT

An improved connector for an electrical cable and method therefor employs a filler cap that provides a seal for protecting the connector against intrusion of unwanted materials. The filler cap may be a planar filler cap in some embodiments, or the filler cap may be a right-angle filler cap in some embodiments suitable for low-profile right-angle connectors. In some embodiments, shaped protrusions are provided on the underside of the filler cap that fit into openings or holes in the connector where the lead terminations appear. In some embodiments, troughs may be formed between the filler cap and the connector for receiving a sealant material, such as an epoxy or resin material, to further seal off the connector. The above arrangement helps prevent or at least minimize unwanted materials from entering the interior of the connector.

20 Claims, 9 Drawing Sheets

(56) References Cited

U.S. PATENT DOCUMENTS 5,056,829 A 10/1991 Kramer
5,071,375 A 12/1991 Savage, Jr.
5,176,536 A * 1/1993 Ganger ................ H01R 13/502
439/582
5,295,844 A 3/1994 Konno
5,509,814 A 4/1996 Mosquera
5,599,212 A 2/1997 Sawada
5,620,347 A 4/1997 Sawada
5,897,404 A 4/1999 Goodman et al.
5,924,879 A 7/1999 Kameyama
5,938,487 A 8/1999 Henry et al.
6,188,583 B1 2/2001 Fendt et al.
6,217,368 B1 4/2001 Baron
6,250,974 B1 6/2001 Kerek
6,299,482 B1 10/2001 Huang
6,394,858 B1 5/2002 Geltsch et al.
6,520,803 B1 2/2003 Dunn
7,048,597 B2 5/2006 Chen
7,140,891 B1 11/2006 Yang
7,223,108 B2 5/2007 Kao
7,234,966 B2 6/2007 Choy
7,347,741 B1 3/2008 Yeomans et al.
7,789,721 B1 9/2010 Burdenko et al.
8,210,860 B2 7/2012 Fukuda
8,465,304 B2 6/2013 Yen
8,465,332 B2 6/2013 Hogan et al.
8,540,525 B2 9/2013 Regnier et al.
8,556,640 B2 10/2013 Mashiyama et al.
8,651,881 B2 2/2014 Regnier et al.
8,827,724 B2 9/2014 Takeuchi et al.
8,840,436 B2 9/2014 Mott et al.
8,876,562 B2 11/2014 Glick et al.
8,882,518 B2 11/2014 Li
8,992,237 B2 3/2015 Regnier et al.
9,017,089 B2 4/2015 Flower et al.
9,325,095 B2 4/2016 Glick et al.
9,356,377 B2 5/2016 Mott et al.
9,368,930 B2 6/2016 Smith et al.
9,450,322 B2 9/2016 Ljubijankic
9,728,882 B1 8/2017 Nakazawa
9,806,449 B2 10/2017 Hachadorian
9,837,750 B2 12/2017 Wu
9,899,750 B1 2/2018 Doiron et al.
9,917,390 B1 3/2018 Bianca et al.
9,954,292 B2 4/2018 Matsui et al.
9,966,686 B2 5/2018 Huang
9,979,111 B2 5/2018 Yoshioka et al.
9,999,127 B2 6/2018 Hu
10,128,624 B2 11/2018 Tyler et al.
10,177,481 B1 1/2019 Hung et al.
10,243,296 B2 3/2019 Cheng
10,276,966 B1 4/2019 Hitchcock
10,305,213 B1 5/2019 Hirakawa et al.
10,326,236 B1 * 6/2019 Harmelink ........... H01R 13/633
10,374,347 B2 8/2019 Bianca et al.
10,411,381 B2 9/2019 Plested et al.
10,431,920 B1 10/2019 Tate
10,615,541 B2 4/2020 Morrison
10,622,742 B2 4/2020 Chen
10,651,587 B2 5/2020 Wu
11,069,997 B1 7/2021 Taylor et al.
11,196,208 B2 12/2021 Cho
2001/0027037 A1 * 10/2001 Kuo ................... H01R 13/6215
439/76.1
2001/0049206 A1 * 12/2001 Johnescu ........... H01R 13/2442
439/66
2004/0127091 A1 7/2004 Naito et al.
2009/0124136 A1 * 5/2009 Pepe ...................... H01R 4/242
439/136
2009/0305530 A1 12/2009 Naotoshi
2010/0093225 A1 4/2010 Wu
2010/0184330 A1 * 7/2010 Wu .................. H01R 13/65918
439/607.28
2014/0308840 A1 10/2014 Kuo
2015/0118868 A1 4/2015 Choi
2015/0217654 A1 * 8/2015 Woo ........................ B60L 53/18
320/109
2015/0311612 A1 * 10/2015 Qiao ...................... H01R 12/75
439/629
2018/0076583 A1 * 3/2018 Yi ........................ H01R 25/003
2019/0067853 A1 * 2/2019 Ehrensvärd ............ H01R 13/20
2019/0267764 A1 * 8/2019 Wu .................... H01R 13/5808
2020/0028295 A1 1/2020 Soubh
2021/0119364 A1 4/2021 Hoffmann
2021/0143579 A1 5/2021 Moreau
2021/0194165 A1 6/2021 Hachadorian
2021/0328378 A1 10/2021 Yu
2021/0376517 A1 * 12/2021 Bobelis ................ H01R 13/645
2021/0399456 A1 12/2021 Brand
2022/0247130 A1 8/2022 Kim et al.

FOREIGN PATENT DOCUMENTS

DE 102005003581 A1 7/2006
EP 1137110 A2 9/2001
EP 3945641 A1 2/2022
EP 3945642 A1 2/2022
GB 2485897 B 6/2015
WO 17005953 A2 1/2017
WO 2019077076 A1 4/2019

* cited by examiner

CABLE CONNECTOR WITH FILLER CAP

CROSS-REFERENCE TO RELATED APPLICATIONS

This application for patent claims the benefit of priority to and incorporates herein by reference U.S. Provisional Application No. 63/333,062, entitled "Improved Connectors for Electrical Cables," filed Apr. 20, 2022.

TECHNICAL FIELD

Embodiments of the present disclosure relate to improvements in the performance, reliability, and ease-of-use of connectors for electrical cables of the type used to transmit electromagnetic energy in the radio frequency range, including twin-axial or "twinax" cable connectors, such as those used in various radio, cellular, and satellite communication systems, as well as various computers and electronic devices.

BACKGROUND

Electrical cable connectors are indispensable components in a variety of applications ranging from military, to industrial, to consumer electronics. As such, it is imperative that connectors be able to meet their designed performance and reliability specifications. This is especially true in military and aerospace applications where connectors are frequently exposed to harsh environmental and operating conditions involving mechanical vibrations and other physical stresses.

Consistent with the above, care should be taken to minimize or prevent debris, contaminants, and other unwanted materials from entering electrical cable connectors. For example, connectors are often mounted onto printed circuit boards (PCB) using an automated process that places and solders the connectors onto the PCB. During this process, the connectors are often exposed to excess soldering material and other unwanted materials. Unwanted materials may also enter the connectors at various other points during the manufacturing and assembly process before reaching their final destination/application. The presence of such unwanted materials in the connectors may cause the connectors to fail prematurely or otherwise not meet their designed performance and reliability specifications.

Therefore, while a number of advances have been made in the electrical cable contractor art over the years, improvements are continually needed.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

Embodiments of the present disclosure provide an improved connector for an electrical cable and method therefor. In some embodiments, the improved electrical cable connector herein includes a filler cap that provides a seal for protecting the connector against intrusion of unwanted materials. The filler cap may be a molded component formed via an injection molding process or similar process to fit any size or shape connector. In some embodiments, the filler cap may be a planar filler cap suitable for regular profile connectors, or it may be a right-angle filler cap suitable for low-profile right-angle connectors. In some embodiments, shaped protrusions are provided on the underside of the filler cap that fit into openings or holes in the connector where lead terminations appear. In some embodiments, troughs may be formed between the filler cap and the connector for receiving a sealant material, such as an epoxy or resin material, to further seal the connector. The above arrangement helps prevent or at least minimize unwanted materials from entering the interior of the connector.

In general, in one aspect, embodiments of the present disclosure relate to a filler cap for an electrical cable connector. The filler cap comprises, among other things, a cap and at least one trough on the cap extending substantially parallel to an edge of the cap. The cap has a size and shape selected to fit a size and shape of an underside of the electrical cable connector.

In general, in another aspect, embodiments of the present disclosure relate to a connector for an electrical cable. The connector comprises, among other things, a generally rectangular connector base, and a generally rectangular hood extending from the connector base. The connector also comprises a plurality of socket passageways arranged within the hood, and a plurality of sockets disposed within the plurality of socket passageways, each socket configured to receive a connector lead therein. The connector further comprises a filler cap mounted on an underside of the connector base, the filler cap covering the plurality of socket passageways and the plurality of sockets disposed therein. The filler cap comprises at least one trough extending substantially parallel to an edge of the filler cap.

In general, in yet another aspect, embodiments of the present disclosure relate a method of assembling a connector for an electrical cable. The method comprises providing a generally rectangular connector base having a generally rectangular hood extending from the connector base. The method also comprises arranging a plurality of socket passageways within the hood, and disposing a plurality of sockets within the plurality of socket passageways, each socket configured to receive a connector lead therein. The method further comprises mounting a filler cap on an underside of the connector base, the filler cap covering the plurality of socket passageways and the plurality of sockets disposed therein. The filler cap comprises at least one trough extending substantially parallel to an edge of the filler cap.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, embodiments of the present disclosure relate to improved connectors for cables that are used to transmit electrical signals, particularly in the radio frequency and other high frequency ranges. Examples of such electrical cables include discrete cables, twinax cables, RF cables and other types of cables often found in radio, cellular, and satellite communication systems, computers and electronic devices, and similar applications. The connectors disclosed herein feature a filler cap that can be attached, for example, by snapping into place to cover the bottom side of the connector. The filler cap minimizes or prevents intrusion of debris, contaminants, and other unwanted materials into the connector during manufacturing and assembly.

Figure 1B:
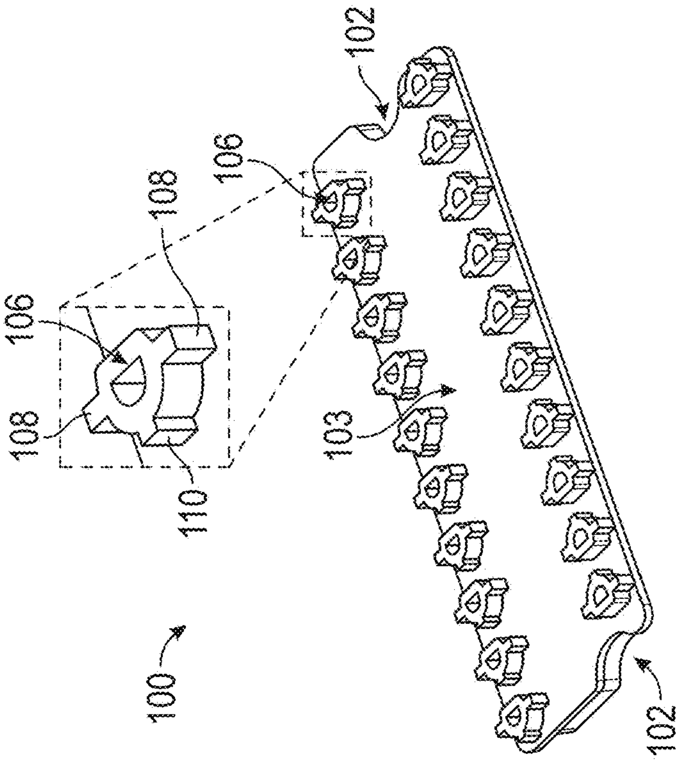
FIGS. 1A and 1B are top side and bottom side perspective views showing an exemplary filler cap for an electrical cable connector according to embodiments of the present disclosure.
Figure 1A:
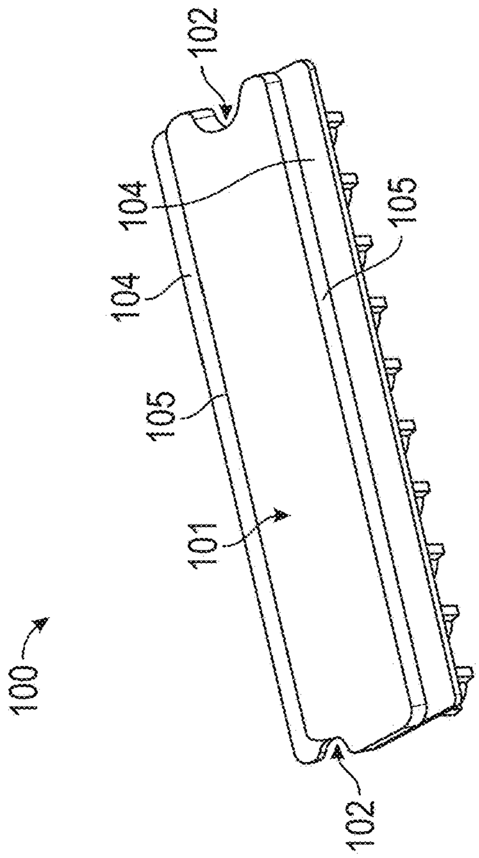

Referring now to FIGS. 1A and 1B, top side and bottom side perspective views of a filler cap 100 are shown according to embodiments of the present disclosure. As can be seen, the filler cap 100 is generally planar or flat and has a generally rectangular shape designed to fit a particular rectangular shaped connector. Those having ordinary skill in the art will appreciate that the principles and teachings herein are equally applicable to filler caps and connectors having other shapes, such as a square shape, as well as nonrectangular shapes. For reference, the top side of the filler cap 100 refers to the side that faces outward from the connector when the cap 100 is mounted on the connector, labeled here as 101, while the bottom side of the cap 100 refers to the side that faces inward when the cap 100 is mounted on the connector, labeled here as 103.

In the embodiment shown, the cap 100 has one or more notches 102 located on the short edges (i.e., longitudinal ends) of the cap. As will be explained later herein, the one or more notches 102 accommodate one or more alignment pins in the connector to allow the filler cap 102 to fit over the one or more alignment pins. In the present example, a notch 102 is provided on each end of the filler cap 100, with the notch 102 on one end being centered along its respective edge, while the notch 102 on the opposite end being off-centered along its respective edge. It is of course possible for the notches 102 on both ends to be off-centered along their respective edges, albeit off-centered by different amounts. It is also possible to omit a notch 102 from either of the longitudinal ends in some embodiments, such that only one end has a notch 102. It is further possible to locate one or more notches 102 along the long edges (i.e., transverse ends) of the cap 100 in some embodiments, either as an alternative or in addition to the one or more notches 102 on the short edges. In embodiments where the filler cap 100 has more than one notch 102, as shown here, the notches 102 may have the same size and shape, or one or more of the notches 102 may have a different size and/or shape.

In the embodiment shown, the top side 101 of the filler cap 100 also has vertical drop-downs 105 running in parallel along the length of the filler cap 100 that create a generally rectangular step-down 104 alongside the long edges of the filler cap 100. The step-downs 104 define a trough extending the length of the cap 100, shown later herein, for receiving a sealant material, such as an epoxy or resin material, on either side of the filler cap 100 when the filler cap 100 is mounted to the connector. The sealant material further helps to prevent intrusion of unwanted materials into the interior of the connector.

As best seen in FIG. 1B, a plurality of shaped protrusions 106 are provided along the long edges on the bottom side of the filler cap 100. The protrusions 106 are equally spaced apart from one another and shaped to fit corresponding socket passageways formed in the connector. The shaped protrusions 106 are designed to snugly fit their corresponding socket passageways to allow the filler cap 100 to be snapped onto the connector, thereby tightly securing the filler cap 100 to the connector. This helps to releasably secure the filler cap 100 in place on the connector so the connector may be handled and manipulated without the filler cap inadvertently coming off.

The shape of the protrusions 106 depends on the contour of the socket and socket passageways in the connector, in some embodiments. For example, in this embodiment, each shaped protrusion 106 has a shape generally resembling a "D" that has been designed to accommodate a socket passageway having a generally D-shaped cross-section when a socket is disposed in the socket passageway. In the embodiment, there are two vertical arms 108 extending in opposite directions, respectively, from near the top and bottom of the "D" in parallel to the flat (vertical part) of the "D," and a side arm 110 extending from the bulge of the "D" substantially perpendicular to the flat of the "D." The top and bottom arms 108 and the side arm 110 along with the flat of the "D" serve to brace the shaped protrusion 106 within the socket passageway, thereby snugly wedging the protrusion 106 within the socket passageway. Those having ordinary skill in the art will appreciate that other shapes and configurations may be used for the shaped protrusion 106 as needed to fit the socket passageways of the connector. In general, the shape of the shaped protrusions 106 should snugly fit the contour of the socket passageways in the connector to allow the filler cap 100 to be releasably secured to the connector, such as by snapping the filler cap 100 onto the connector.

In some embodiments, the filler cap 100 may be formed using a molding process or similar process in which a melted resin or suitable plastic material is poured or injected into a mold cavity. Such molding processes are well known to those having ordinary skill in the art and therefore a detailed description is omitted here for economy.

Figure 2B:
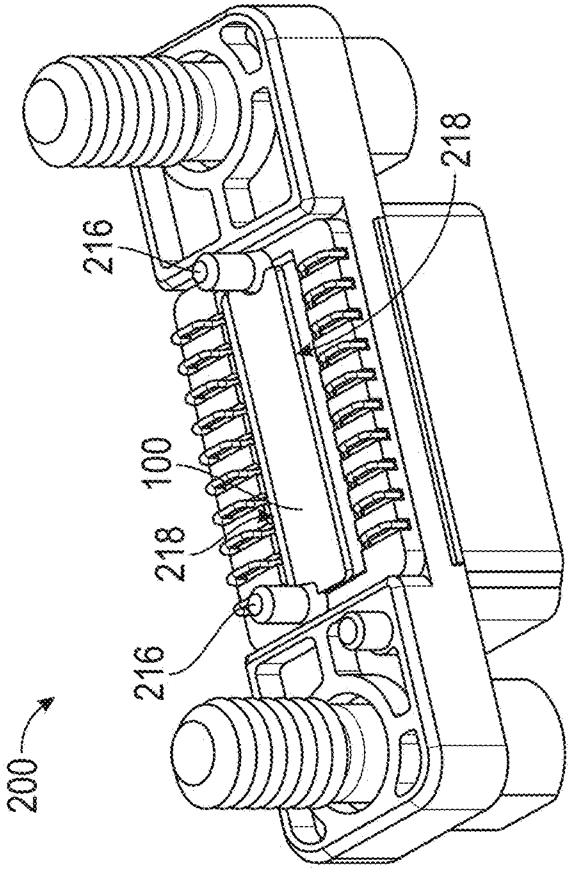
FIGS. 2A and 2B are bottom side perspective views showing an exemplary electrical cable connector according to embodiments of the present disclosure.
Figure 2A:
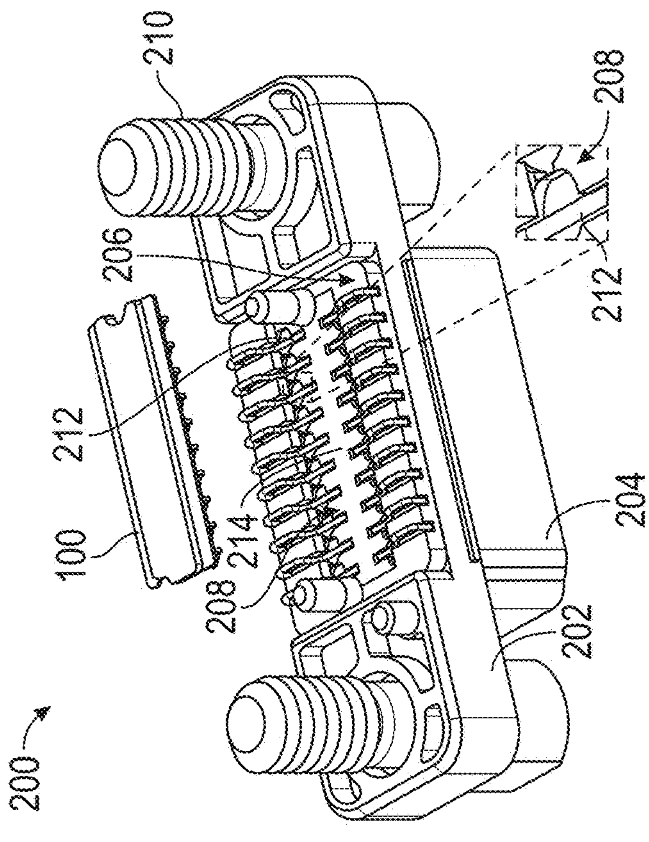

Referring next to FIGS. 2A and 2B, bottom perspective views are shown for an exemplary connector 200 that uses the filler cap 100 disclosed herein. The connector 200 in this example is a type of connector that is typically mounted to a PCB, as indicated by J-style terminations 212 protruding from the bottom of the connector 200, which can be soldered to the PCB. This board-mount connector 200 is exemplary only and many other types of connectors are contemplated for use with the filler caps 100 within the scope of the present disclosure.

As can be seen, the board-mount connector 200 is composed of a shell having has a generally rectangular base 202 and a generally rectangular hood 204 extending generally perpendicularly from the base 202. The underside 206 (i.e., board mount side) of the connector 200 has a plurality of sockets and socket passageways 208 therein. Each socket passageway 208 has a lead socket disposed therein, although only the J-style terminations 212 of the lead sockets are visible in this view. As mentioned earlier, the socket passageway 208 in this embodiment has a generally D-shaped cross-section when the lead socket is disposed in the socket passageway 208, with the J-style termination 212 forming the flat (vertical part) of the "D." Threaded guide posts 210 protrude from the base 202 on either side of the protective hood 204 to facilitate connecting the board-mount connector 200 to a similar connector having a corresponding male connector portion. Such a board-mount connector 200 may be mounted to the PCB by soldering the J-style terminations 212 to the circuit board.

In accordance with embodiments of the present disclosure, the filler cap 100 may be attached to the connector 200 to minimize or prevent intrusion of unwanted materials into the interior of the connector 200 during the soldering process, as well as other manufacturing and assembly processes. In the embodiment shown, the filler cap 100 is snapped into place on the connector 200, although other suitable attachment means may also be used to releasably secure the filler cap 100 to the connector 200. In particular, as best seen in FIG. 2A, the filler cap 100 may be fitted within a depression 214 of the connector 200 and then pressed into place. When pressed into place, the shaped protrusions 106 (FIGS. 1A and 1B) snap into the socket passageways 208 to secure the filler cap 100 to the connector 200. When thus secured, the filler cap 100 covers over the socket passageways 208 and any other exposed portions of the connector 200, thereby blocking unwanted materials from entering into the interior of the connector 200.

As best seen in FIG. 2B, in some embodiments, the connector 200 may have one or more alignment pins 216 protruding from the bottom of the connector 200 to facilitate proper placement and/or orientation of the connector 200 on the PCB. In these embodiments, the filler cap 100 may be provided with one or more notches 102 (FIGS. 1A and 1B) having a size, shape, and location that correspond to the one or more alignment pins 216. The one or more notches 102 allow the filler cap 100 to receive the alignment pins 216 when the filler cap 100 is secured to the connector 200. When thus secured, the step-downs 104 (FIGS. 1A and 1B) of the filler cap 100 and the bottom of the connector 200 create a trough 218 running lengthwise on either side of the filler cap 100. A suitable sealant material, such as an epoxy or resin material, may then be injected or flowed into the troughs 218 to further minimize or prevent entry of unwanted materials into the connector 200.

Figure 3:
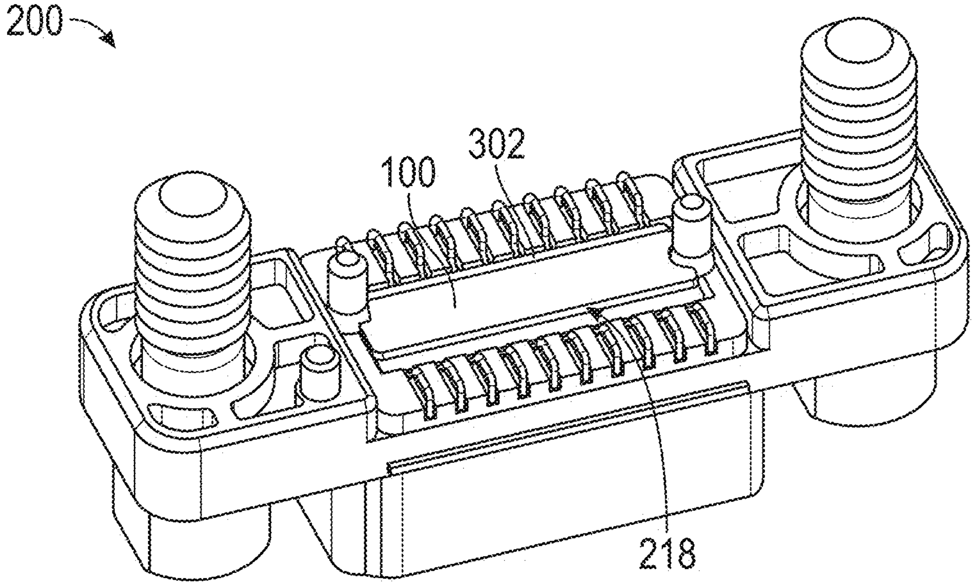
FIG. 3 is a bottom side perspective view showing an exemplary electrical cable connector according to embodiments of the present disclosure.

FIG. 3 shows a bottom perspective view of the exemplary connector 200 from FIGS. 2A and 2B with the filler cap 100 mounted on the connector 200. As this view shows, the troughs 218 running alongside the filler cap 100 are filled with a sealant material 302 to further minimize or prevent entry of unwanted materials into the connector 200. The sealant material 302 may be an epoxy material, a resin material, or other suitable sealant material known to those having ordinary skill in the art.

Using a filler cap 100 as described above with a connector 200 provides significant advantages during the manufacturing and assembly process. During one or more of these processes, unwanted materials may enter the connector 200, for example, through the socket passageways 208. By closing off the socket passageways 208 and other exposed areas in the connector with a filler cap such as the filler cap 100, entry of unwanted materials into the passageways 208 can be prevented or at least minimized. Additionally, troughs like the troughs 218 may be formed along the short edges of the filler cap 100 in some embodiments and filled with a sealant material to further minimize and/or prevent entry of unwanted materials into the connector 200.

Figure 4A:
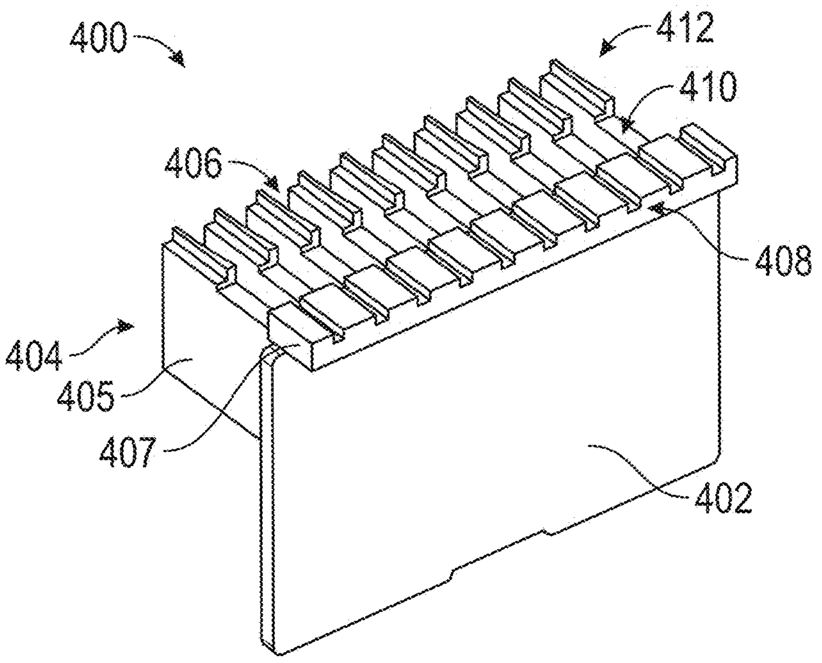
FIGS. 4A and 4B are perspective and plan views showing an exemplary low-profile right-angle filler cap for an electrical cable connector according to embodiments of the present disclosure.
Figure 4B:
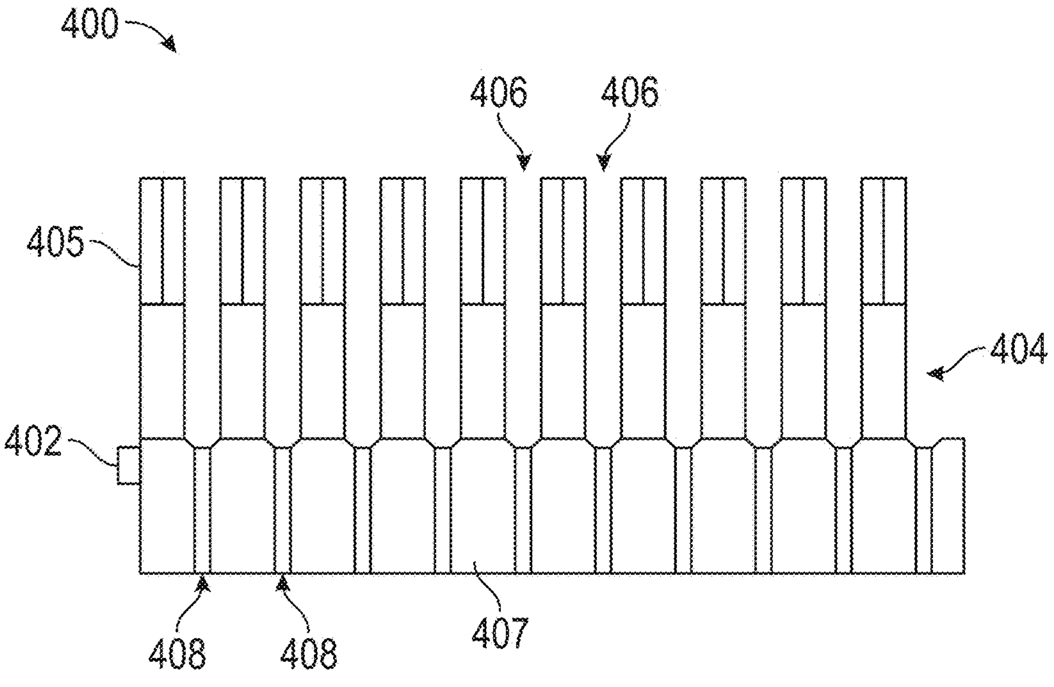

Referring now to FIGS. 4A and 4B, perspective and plan views are shown, respectively, for another filler cap 400 according to embodiments of the present disclosure. The filler cap 400 shown here is low-profile right-angle filler cap 400 suitable for a low-profile right-angle connector. The low-profile right-angle filler cap 400 is a generally 90-degree structure composed of a vertical portion 402 and a horizontal portion 404. The vertical portion 402 resembles a wall that is sized and shaped to extend along the backside of the low-profile right-angle connector (which is in turn generally perpendicular to the PCB), while the horizontal portion 404 extends along the underside of the low-profile right-angle connector (which is in turn generally horizontal to the PCB).

As can be seen in FIG. 4B, the horizontal portion 404 is composed of several generally rectangular planar partitions 405 that extend perpendicularly from the vertical wall portion 402. The partitions 405 are equally spaced apart from one another (although equal spacing is not strictly required), which leaves a gap 406 between adjacent partitions 405. The lead terminations in the low-profile right-angle connector are then received in the gaps 406, shown later herein, when the filler cap 400 is attached to the connector. There are ten generally rectangular partitions 405 in the embodiment shown, but other embodiments may have fewer or more than ten partitions 405, depending on the particular connector application.

Each rectangular partition 405 has an overhang 407 that rests on the vertical portion 402, such that the overhangs 407 extend over and beyond the vertical portion 402. The spacing between the partitions 405 creates a horizontal groove 408 between adjacent overhangs 407. The horizontal grooves 407 has a size and shape to accommodate additional lead terminations in the low-profile right-angle connector, shown later herein. In some embodiments, the lead terminations may be J-style terminations. In the depicted embodiment, there is an additional horizontal groove 407 beyond the rightmost partition 405, although this additional groove 407 is not strictly necessary, depending on the number of lead terminations provided in the low-profile right-angle connector.

As best seen in FIG. 4A, each partition 405 has a shaped depression 410 resembling a rectangular cutout along the top edge of the partition near the middle of the partition. When the filler cap 400 is attached to the connector, the shaped depressions 410 of the various partitions 405 form a trough, shown later herein, for receiving a sealant material, such as an epoxy or resin material, in the horizontal portion 404 of the filler cap 400. Also present along the top edge of each partition 405 at the end of the partition 405 furthest from the vertical wall portion 402 is an L-shaped frame 412. Each L-shaped frame 412 extends toward the vertical wall portion, ending at the depression 410.

In some embodiments, the low-profile filler cap 400, like the regular profile filler cap 100, may be formed using a molding process or similar process in which a melted resin or suitable plastic material is poured or injected into a mold cavity. Unlike the filler cap 100, however, the low-profile filler cap 400 may be formed either as a unitary component, or the vertical portion 402 and the horizontal portion 404 may be formed as separate components and subsequently assembled or attached to one another using a suitable attachment means (e.g., chemical attachment, mechanical attachment, etc.) to form the filler cap 400.

Although not visible in the views shown, in some embodiments, the vertical portion 402 of the filler cap 400 may be provided with shaped protrusions on the bottom side thereof similar to the shaped protrusions 106 from FIGS. 1A and 1B, again, via the molding process mentioned above.

Figure 5B:
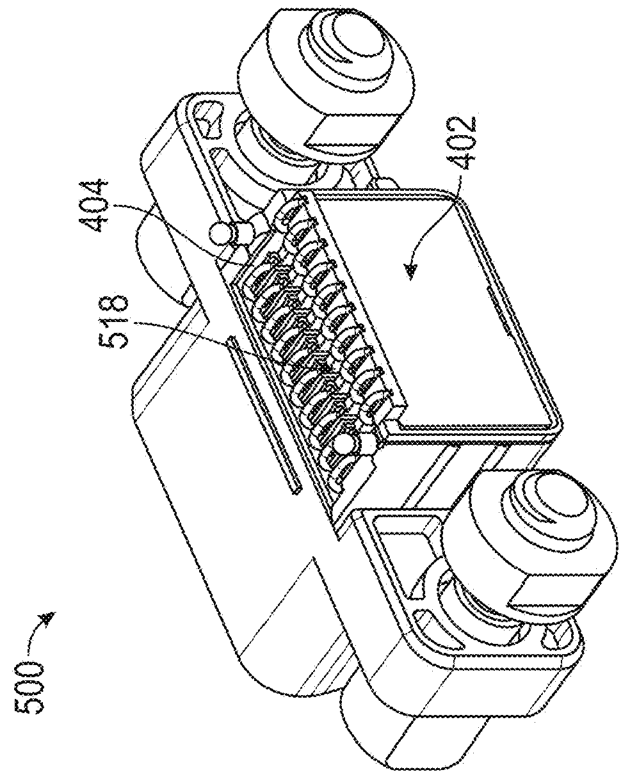
FIGS. 5A and 5B are bottom side perspective views showing an exemplary low-profile right-angle electrical cable connector according to embodiments of the present disclosure.
Figure 5A:
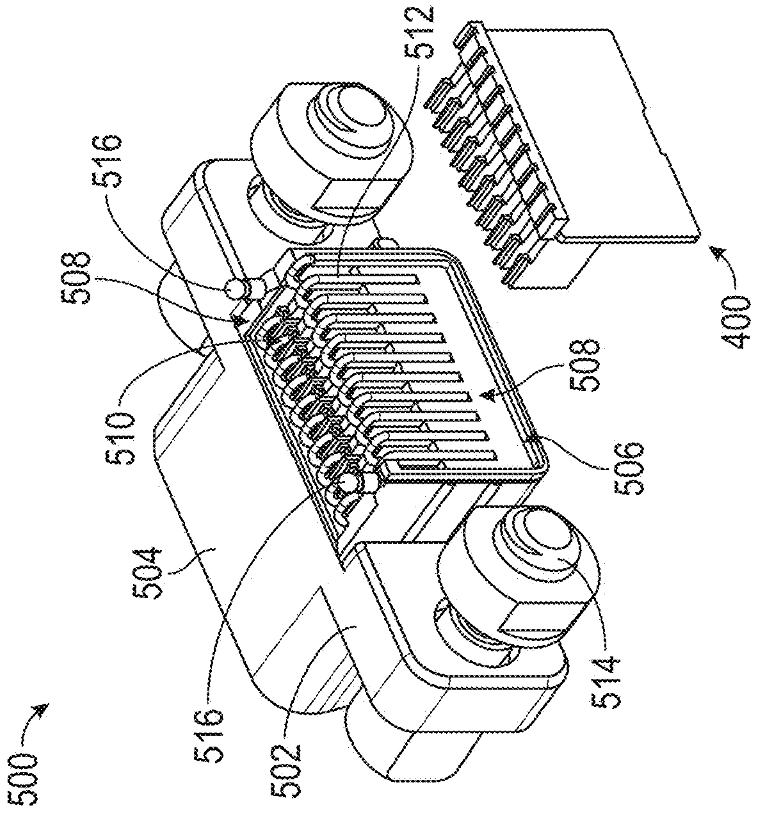

FIGS. 5A and 5B illustrate perspective views of an exemplary low-profile right-angle connector 500 that uses the low-profile filler cap 400 disclosed herein. As before, the low-profile connector 500 in this example is a type of connector that is typically mounted to a PCB. Again, the low-profile connector 500 is exemplary only and many other types of connectors are contemplated for use with the low-profile filler cap 400 within the scope of the present disclosure.

As can be seen, the low-profile connector 500 has a generally rectangular base 502 and a generally rectangular hood 504 extending generally perpendicularly from the base 502. A backside 506 of the connector 500 has a plurality of socket passageways 508 therein for receiving a plurality sockets. Similarly, an underside 510 (i.e., board mount side) of the connector 500 also has a plurality socket passageways 508 therein for receiving a plurality sockets. Again, only the lead terminations 512 of the sockets are visible in these views, these lead terminations being J-style terminations here. Threaded guide posts 514 protrude from the base 502 on either side of the protective hood 504. The connector 500 may also have or more alignment pins 516 therein to facilitate proper placement and/or orientation of the connector 500 on the PCB.

In accordance with embodiments of the present disclosure, the low-profile filler cap 400 discussed earlier may be releasably attached to the low-profile right-angle connector 500 to cover the backside 506 and the underside 510 of the connector. Any suitable attachment means may be use to releasably attach the filler cap 400 to the connector 500, including snapping the cap 400 into place, press fitting the cap 400 to the connector 500, or any other suitable attachment means known to those skilled in the art. In particular, when the filler cap 400 is in place on the low-profile connector 500, each partition 405 fits within the open space between adjacent lead terminations 512 in the connector 500, such that the depressions 408 in the various partitions 405 form a trough 518 running lengthwise along the middle of the horizontal portion 404 of the filler cap 400.

Figure 6:
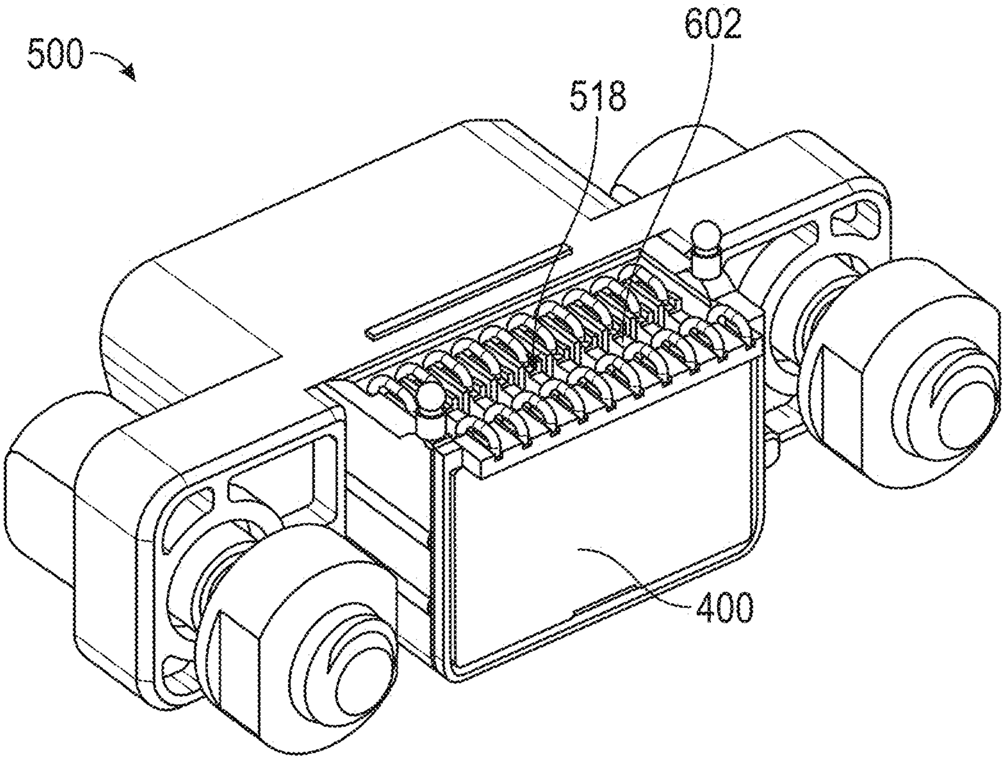
FIG. 6 is a bottom side perspective view showing an exemplary low-profile right-angle electrical cable connector according to embodiments of the present disclosure.

FIG. 6 shows a perspective view of the exemplary connector 500 from FIGS. 5A and 5B with the filler cap 400 mounted thereon. The trough 518 can be seen running lengthwise along the middle of the filler cap 400. A sealant material 602 has filled the trough 518 to further minimize or prevent entry of unwanted materials into the connector 500. The sealant material 602 may be an epoxy material, a resin material, or other suitable sealant material known to those having ordinary skill in the art.

Figure 7A:
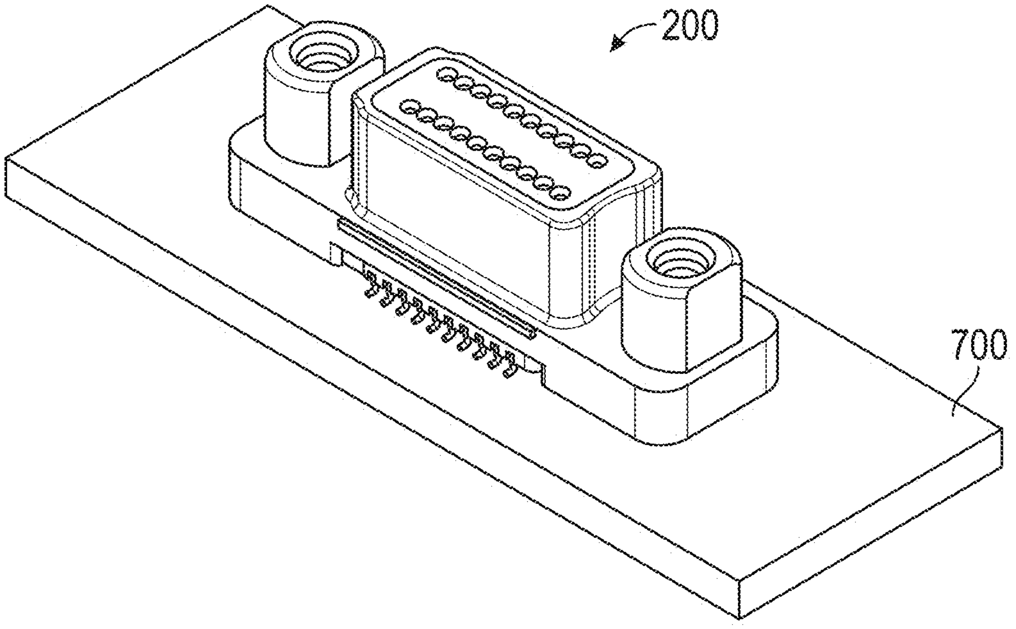
FIGS. 7A and 7B are top and bottom perspective views showing an exemplary connector having a filler cap mounted therein according to embodiments of the present disclosure.
Figure 7B:
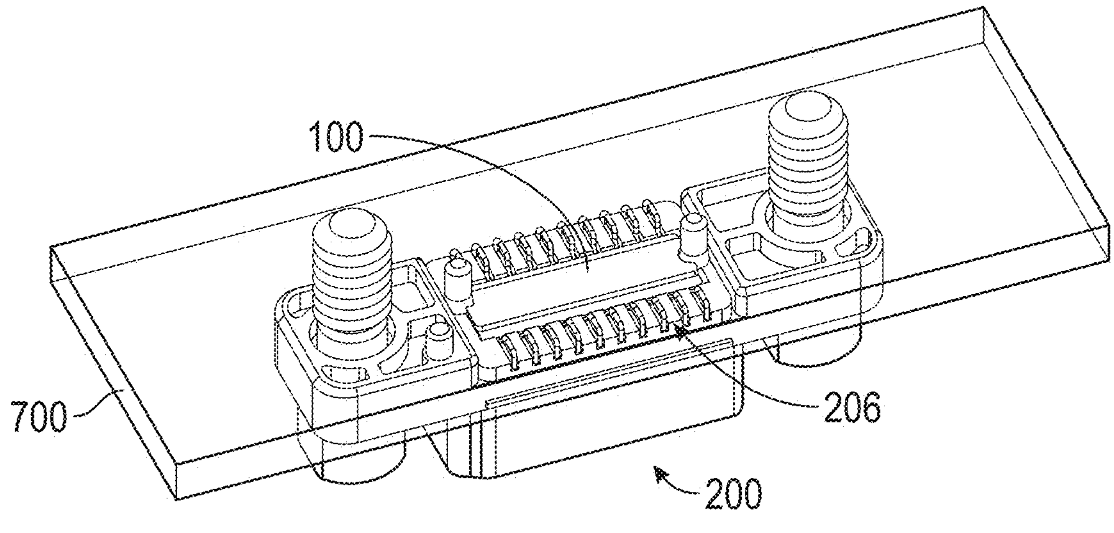

FIGS. 7A and 7B show top and bottom perspective views, respectively, of the exemplary connector 200 from FIGS. 2A and 2B being mounted on a PCB 700. As best shown in FIG. 7B, the filler cap 100 from FIGS. 1A and 1B is mounted to the underside 206 of the connector 200, such that the filler cap 100 provides a shield between the connector 200 and the PCB 700. This helps prevent or at least minimize any unwanted materials from entering the connector 200 during the process of soldering the connector 200 to the PCB 700.

Figure 8B:
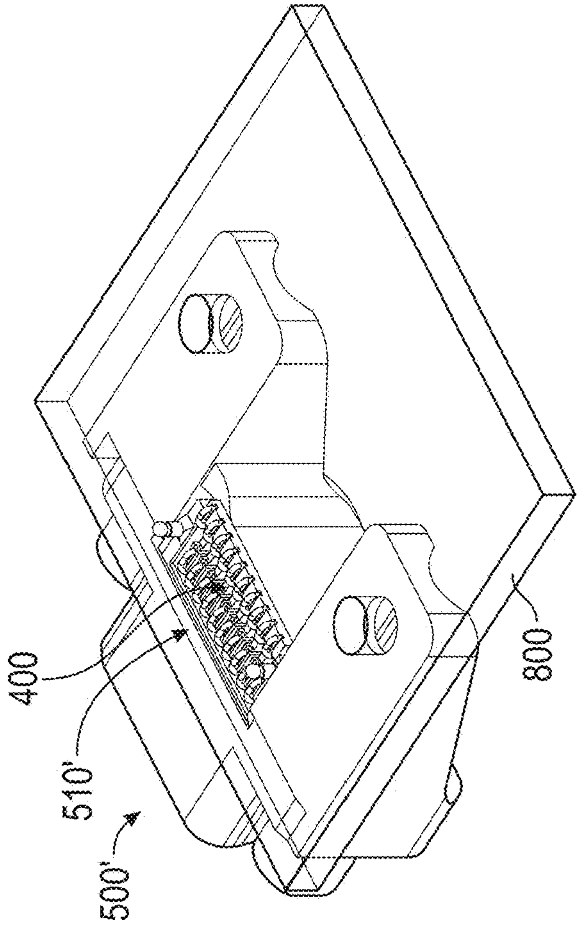
FIGS. 8A and 8B are top and bottom perspective views showing an exemplary low-profile-right-angle connector having a filler cap mounted therein according to embodiments of the present disclosure.
Figure 8A:
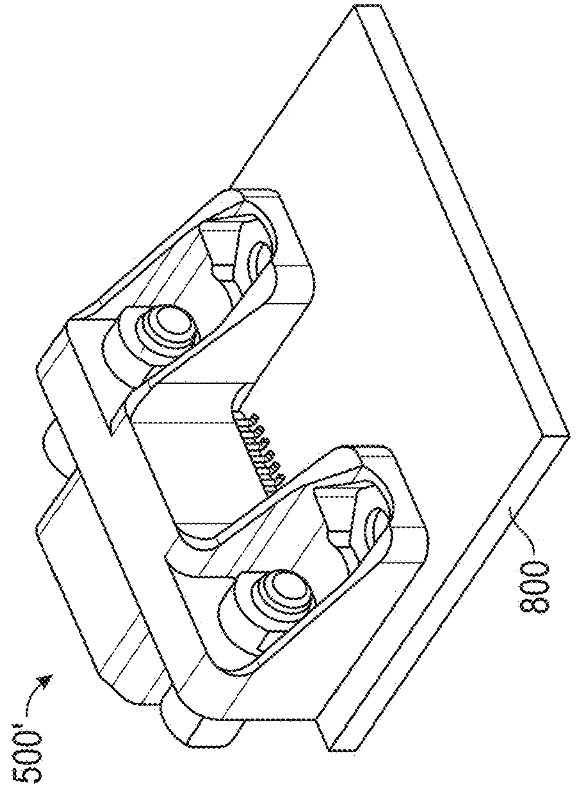

FIGS. 8A and 8B show similar top and bottom perspective views, respectively, of an exemplary low-profile right-angle connector 500' being mounted on a PCB 800. The low-profile right-angle connector 500' here is similar to the low-profile right-angle connector 500 seen in FIGS. 5A and 5B except that the base 502' has a somewhat different shape from the base 502 discussed earlier. As best shown in FIG. 8B, the filler cap 400 from FIGS. 4A and 4B is mounted to the underside 510' of the connector 500', such that the filler cap 400 provides a shield between the connector 500' and the PCB 800. Again, this helps prevent or at least minimize any unwanted materials from entering the connector 500' during the process of soldering the connector 500' to the PCB 800.

Figure 9:
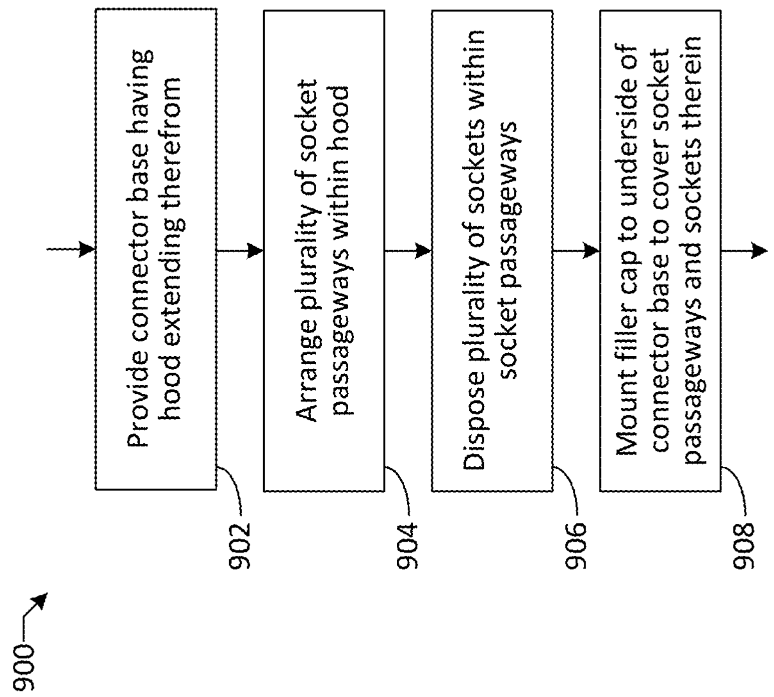
FIG. 9 is a flowchart showing an exemplary method of assembling an electrical cable connector having a filler cap therein according to embodiments of the present disclosure.

FIG. 9 illustrates a flowchart 900 showing an exemplary method of assembling a connector like the connector 200 or 500 herein according to embodiments of present disclosure. The flowchart 900 generally begins at 902, where a connector shell is provided having a generally rectangular base and a generally rectangular hood extending therefrom. At 904, a plurality of socket passageways is arranged within the protective hood. At 906, a plurality of sockets is disposed within the plurality of socket passageways, each socket configured to receive a connector lead therein. In accordance with embodiments of the present disclosure, a filler cap is mounted on an underside of the connector base at 908, the filler cap covering the plurality of socket passageways and the plurality of sockets disposed therein.

While a number of specific embodiments have been shown and described herein, it is to be understood that such embodiments are intended to be exemplary only. Many other exemplary embodiments will become apparent upon reading and understanding the present specification and drawings. Accordingly, the specification and drawings are to be regarded as illustrative and not restrictive. The scope of the present disclosure should therefore be determined with reference to the appended claims, including the full scope of equivalents to which such claims are entitled.

We claim:

1. A filler cap for an electrical cable connector, the filler cap comprising:

a first side; and at least one trough on the first side of the filler cap extending substantially parallel to an edge of the first side;

wherein the filler cap has a size and shape selected to fit within a size and shape of an underside of the electrical cable connector and between two rows of terminations of the electrical cable connector.

2. The filler cap of claim 1, further comprising a notch on the filler cap, the notch having a size and shape selected to fit a size and shape of an alignment pin on the electrical cable connector.

3. The filler cap of claim 1, further comprising a plurality of shaped protrusions on the filler cap, each shaped protrusion having a size and shape selected to fit a size and shape of a socket passageway in the electrical cable connector.

4. The filler cap of claim 1, wherein electrical cable connector is a low-profile right-angle connector and the filler cap is a low-profile right-angle cap.

5. The filler cap of claim 4, wherein the low-profile right-angle cap has a vertical portion and a horizontal portion, the horizontal portion comprising a plurality of planar partitions extending perpendicularly to the vertical portion.

6. The filler cap of claim 5, wherein the plurality of planar partitions are arranged on the filler cap such that adjacent partitions define a gap therebetween, each gap having a size selected to receive a lead termination therein.

7. The filler cap of claim 5, wherein the plurality of planar partitions are arranged on the filler cap such that adjacent partitions define a groove therebetween, each groove having a size selected to receive a lead termination therein.

8. A connector for an electrical cable, the connector comprising:

a generally rectangular connector base;

a generally rectangular hood extending from the connector base; a plurality of socket passageways arranged in rows within the hood;

a plurality of sockets disposed within the plurality of socket passageways, each socket configured to receive a connector lead therein; and a filler cap mounted on an underside of the connector base, the filler cap covering the plurality of socket passageways and the plurality of sockets disposed therein;

wherein the filler cap comprises troughs extending substantially parallel to edges of the filler cap, and each of the troughs covers one of the rows of the plurality of socket passageways.

9. The connector of claim 8, wherein the filler cap further comprises a notch thereon, the notch having a size and shape selected to fit a size and shape of an alignment pin on the connector.

10. The connector of claim 8, wherein the filler cap further comprises a plurality of shaped protrusions thereon, each shaped protrusion having a size and shape selected to fit a size and shape of a socket passageway in the connector.

11. The connector of claim 8, wherein the connector is a low-profile right-angle connector and the filler cap is a low-profile right-angle filler cap.

12. The connector of claim 11, wherein the low-profile right-angle filler cap has a vertical portion and a horizontal portion, the horizontal portion comprising a plurality of planar partitions extending perpendicularly to the vertical portion.

13. The connector of claim 12, wherein the plurality of planar partitions are arranged on the filler cap such that adjacent partitions define a gap therebetween, each gap having a size selected to receive a lead termination of a socket therein.

14. The connector of claim 12, wherein the plurality of planar partitions are arranged on the filler cap such that adjacent partitions define a groove therebetween, each groove having a size selected to receive a lead termination of a socket therein.

15. A method of assembling a connector for an electrical cable, the method comprising:

providing a generally rectangular connector base having a generally rectangular hood extending from the connector base;

arranging a plurality of socket passageways in rows within the hood;

disposing a plurality of sockets within the plurality of socket passageways, each socket configured to receive a connector lead therein; and mounting a filler cap on an underside of the connector base, the filler cap covering the plurality of socket passageways and the plurality of sockets disposed therein;

wherein the filler cap comprises troughs extending substantially parallel to edges of the filler cap, and each of the troughs covers one of the rows of the plurality of socket passageways.

16. The method of claim 15, further comprising providing a notch on the filler cap, the notch having a size and shape selected to fit a size and shape of an alignment pin on the connector.

17. The method of claim 15, further comprising providing a plurality of shaped protrusions on the filler cap, each shaped protrusion having a size and shape selected to fit a size and shape of a socket passageway in the connector.

18. The method of claim 15, wherein the connector is a low-profile right-angle connector and the filler cap is a low-profile right-angle filler cap.

19. The method of claim 8, wherein the low-profile right-angle filler cap has a vertical portion and a horizontal portion, the horizontal portion comprising a plurality of planar partitions extending perpendicularly to the vertical portion.

20. The method of claim 19, further comprising arranging the plurality of planar partitions on the filler cap such that adjacent partitions define a gap therebetween, each gap having a size selected to receive a lead termination of a socket therein.

* * * * *